United States Patent
Baba

(10) Patent No.: US 9,653,922 B2
(45) Date of Patent: May 16, 2017

(54) POWER SUPPLY APPARATUS, CONTROL METHOD OF POWER SUPPLY APPARATUS, AND POWER SUPPLY SYSTEM

(71) Applicant: KYOCERA CORPORATION, Kyoto (JP)

(72) Inventor: Masahiro Baba, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 553 days.

(21) Appl. No.: 14/358,446

(22) PCT Filed: Nov. 6, 2012

(86) PCT No.: PCT/JP2012/007094
§ 371 (c)(1),
(2) Date: May 15, 2014

(87) PCT Pub. No.: WO2013/073130
PCT Pub. Date: May 23, 2013

(65) Prior Publication Data
US 2014/0333140 A1 Nov. 13, 2014

(30) Foreign Application Priority Data
Nov. 15, 2011 (JP) .................................. 2011-249378

(51) Int. Cl.
*H02J 3/38* (2006.01)
*H02J 3/12* (2006.01)
(Continued)

(52) U.S. Cl.
CPC ........ *H02J 3/38* (2013.01); *H02J 3/12* (2013.01); *H02J 5/00* (2013.01); *H02J 13/00* (2013.01); *Y10T 307/707* (2015.04)

(58) Field of Classification Search
CPC ........................................................ H02J 3/38
(Continued)

(56) References Cited

U.S. PATENT DOCUMENTS

| 2002/0036430 A1* | 3/2002 | Welches ................. F02G 1/043 307/18 |
| 2004/0032127 A1 | 2/2004 | Tokiwa et al. |

(Continued)

FOREIGN PATENT DOCUMENTS

| JP | 2000-152506 A | 5/2000 |
| JP | 2002-247765 A | 8/2002 |
| JP | 2011-010513 A | 1/2011 |

OTHER PUBLICATIONS

European Search Report dated Aug. 3, 2015 issued by the European Patent Office for Counterpart European Application No. PCT/JP2012/007094.

(Continued)

*Primary Examiner* — Joseph Chang
(74) *Attorney, Agent, or Firm* — Procopio Cory Hargreaves and Savitch LLP

(57) ABSTRACT

Provided is a plurality of power supply apparatuses connected in parallel with a grid that are capable of obtaining the same measured values of the same voltage.
The power supply apparatus according to the present invention is connected in parallel with the grid and includes a voltage sensor 108 configured to obtain a first measured voltage value by measuring a voltage of the grid, a communication interface 114 configured to communicate with another power supply apparatus connected in parallel with the grid, and a controller 118 configured to obtain, via the communication interface 114, a second measured voltage value obtained by the another power supply apparatus by measuring the voltage of the grid and carrying out an adjustment such that the first measured voltage value and the (Continued)

second measured voltage value of the same voltage of the grid approximate to the same value.

12 Claims, 7 Drawing Sheets

(51) Int. Cl.
    *H02J 5/00*           (2016.01)
    *H02J 13/00*         (2006.01)

(58) Field of Classification Search
    USPC .......................................................... 307/82
    See application file for complete search history.

(56) References Cited

U.S. PATENT DOCUMENTS

2009/0040029 A1*   2/2009   Bridges .................. G06Q 50/06
                                                                    340/12.37
2013/0262012 A1   10/2013   O'Sullivan et al.

OTHER PUBLICATIONS

International Search Report; PCT/JP2012/007094; Jan. 15, 2013.

* cited by examiner

FIG. 3A

| Accuracy | Reference grade |
|---|---|
| ±0.1% | 5 |
| ±1.0% | 4 |
| ±2.5% | 3 |
| ±5.0% | 2 |

FIG. 3B

| Temperature characteristics | Relative grade |
|---|---|
| ±0.1% | +2 |
| ±1.0% | +1 |
| ±2.5% | −1 |
| ±5.0% | −2 |

FIG. 3C

| Cumulative operation time | Relative grade |
|---|---|
| Half year | +3 |
| One year | ±0 |
| Three years | −1 |
| Five years | −2 |

POWER SUPPLY APPARATUS, CONTROL METHOD OF POWER SUPPLY APPARATUS, AND POWER SUPPLY SYSTEM

CROSS REFERENCE TO RELATED APPLICATION

This application claims priority to and the benefit of Japanese Patent Application No. 2011-249378 (filed on Nov. 15, 2011), the entire contents of which are incorporated herein by reference.

TECHNICAL FIELD

The present invention relates to a power supply apparatus, a control method of the power supply apparatus, and a power supply system.

BACKGROUND ART

A power supply apparatus converts electric power obtained from a solar cell, a fuel cell, and a storage battery into AC power which is in a format usable by general households. In Japan, a voltage of the AC power is 100 V, and a frequency is 50 Hz or 60 Hz. Normally, the AC power is supplied to the general households by a commercial power supply grid (hereinafter, abbreviated as a "grid" as appropriate).

The power supply apparatus may be connected in parallel with the grid to carry out a linkage operation therewith. Thereby, to a grid load connected to the grid (such as electrical products of the general households), the power from the solar cell and the power from the grid may be supplied. Also, in case of grid power failure, the power supply apparatuses may be disconnected from the grid and operate independently.

In connecting the power supply apparatus to the grid, either a single or a plurality of power supply apparatuses may be connected in parallel with the grid. For example, a solar cell power supply apparatus and a fuel cell power supply apparatus may be connected in parallel with the grid to carry out the linkage operation therewith.

In using the power supply apparatus to carry out the linkage operation with the grid, from the viewpoint of protection of the grid, it is important to prevent power oversupply to the grid such that a grid voltage stays within an appropriate voltage range. Accordingly, in case of power oversupply, it is necessary to suppress the power supply by stopping a converter and an inverter of the power supply apparatus so as to prevent an increase in the grid voltage. When the power supply is suppressed, the grid voltage drops, thereby preventing the increase in the grid voltage exceeding the appropriate voltage range.

There is known a power supply apparatus that, in order to prevent the power oversupply to the grid, includes a voltage sensor for measuring the grid voltage and controls a function of the power supply apparatus based on the voltage measured by the voltage sensor (for example, see Patent Document 1).

RELATED ART DOCUMENT

Patent Document

Patent Document 1: Japanese Patent Application Laid-Open Publication No. 2000-152506

SUMMARY OF INVENTION

Technical Problem

Incidentally, in installing the power supply apparatus, in order to facilitate recovery of an initial cost, an inexpensive power supply apparatus is preferable. Since the voltage sensor with high accuracy is generally expensive, the power supply apparatus needs to have an inexpensive voltage sensor.

In general, however, such an inexpensive voltage sensor has low measurement accuracy. Therefore, it is assumed that, when a plurality of power supply apparatuses are connected in parallel with the grid, employing an inexpensive sensor in the power supply apparatus causes disadvantages associated with protection of the grid as described below.

For the purpose of protecting the grid, when the voltage sensor detects an increase in the grid voltage, the power supply apparatus suppresses the power supply by stopping operations of the converter and the inverter.

When a plurality of power supply apparatuses are connected in parallel with the grid to carry out the linkage operation therewith, a priority order is set for each power supply apparatus to start suppressing the grid voltage. In this case, the power supply apparatus that is set to start suppressing a lower voltage starts the suppression first.

As for the priority order for suppressing the power supply apparatus, from the viewpoint of, for example, preferentially using the power from the solar cell that has no function to store the electrical energy, the fuel cell power supply apparatus is preferably suppressed first and the solar cell power supply apparatus is suppressed last.

However, since an inexpensive voltage sensor has low measurement accuracy, measured values of the same voltage may greatly vary and, in such a case, the suppression of the power supply apparatus may possibly start in an order reverse to the desired order.

Accordingly, an object of the present invention in consideration of such a problem is to provide a plurality of power supply apparatuses connected in parallel with the grid that are capable of obtaining measured values of the same voltage closely approximate to one another, a control method of the power supply apparatus, and a power supply system.

Solution to Problem

A power supply apparatus connected in parallel with a grid includes:

a voltage sensor configured to obtain a first measured voltage value by measuring a voltage of the grid;

a communication interface configured to communicate with another power supply apparatus connected in parallel with the grid; and a controller configured to obtain, via the communication interface, a second measured voltage value obtained by the another power supply apparatus by measuring the voltage of the grid and carrying out an adjustment such that the first measured voltage value and the second measured voltage value approximate to the same voltage value of the grid.

A second aspect of the present invention is the power supply apparatus according to a first aspect, wherein the controller includes a first grade as an index of accuracy of the voltage sensor;

obtains a second grade of a voltage sensor of the another power supply apparatus via the communication interface; and compares the first grade to the second grade and carries out an adjustment on the basis of the voltage sensor with a higher grade.

A third aspect of the present invention is the power supply apparatus according to the first or second aspect, wherein the controller carries out the adjustment while stopping an output of the power supply apparatus.

A fourth aspect of the present invention is the power supply apparatus according to the first aspect, wherein the controller, when an adjustment amount exceeds a predetermined threshold, determines that the voltage sensor is faulty.

A fifth aspect of the present invention of the power supply apparatus in order to achieve the above object is a power supply apparatus connected in parallel with a grid includes:

a current sensor configured to obtain a first measured current value by measuring a current output by the power supply apparatus;

a communication interface configured to communicate with another power supply apparatus connected in parallel with the grid; and a controller configured to obtain, via the communication interface, a second measured current value measured and obtained by the another power supply apparatus and carrying out an adjustment such that the first measured current value and the second measured current value approximate to the same value.

A sixth aspect of the present invention is the power supply apparatus according to the fifth aspect, wherein the controller includes a first grade as an index of accuracy of the current sensor;

obtains a second grade of a current sensor of the another power supply apparatus via the communication interface; and compares the first grade to the second grade and carries out an adjustment on the basis of the current sensor with a higher grade.

A seventh aspect of the present invention is the power supply apparatus according to the fifth or sixth aspect, wherein the controller disconnects the power supply apparatus and the another power supply apparatus from the grid to carry out the adjustment.

An eighth aspect of the present invention is the power supply apparatus according to the fifth aspect, wherein the controller, when an adjustment amount exceeds a predetermined threshold, determines that the voltage sensor is faulty.

Although the apparatuses are described above as solutions according to the present invention, it should be understood that the present invention may also be substantialized by a method, a program and a storage medium storing the program that are substantially corresponding to the apparatuses, hence these are also included within a scope of the present invention.

For example, as a method substantializing the present invention, a control method of a power supply apparatus according to a ninth aspect of the present invention, the power supply apparatus being connected in parallel with a grid, the method includes:

a step of obtaining a first measured voltage value by measuring a voltage of the grid;

a step of obtaining a second measured voltage value obtained by another power supply apparatus connected to the grid by measuring the voltage of the grid; and a step of carrying out an adjustment such that the first measured voltage value and the second measured voltage value approximate to the same voltage value of the grid.

As a method substantializing the present invention, a control method of a power supply apparatus according to a tenth aspect of the present invention, the power supply apparatus being connected in parallel with a grid, the method includes:

a step of obtaining a first measured current value by measuring a current output by the power supply apparatus;

a step of obtaining a second measured current value measured and obtained by another power supply apparatus connected to the grid; and a step of carrying out an adjustment such that the first measured current value and the second measured current value approximate to the same value.

As a system substantializing the present invention, a power supply system according to an eleventh aspect of the present invention includes the plurality of power supply apparatuses according to the first aspect connected in parallel with the grid.

As a system substantializing the present invention, a power supply system according to a twelfth aspect of the present invention includes the plurality of power supply apparatuses according to the fifth aspect connected in parallel with the grid.

Effect of the Invention

According to the present invention, a plurality of power supply apparatuses connected in parallel with the grid that are capable of obtaining measured voltage values closely approximate to the same voltage, the control method of the power supply apparatus, and the power supply system may be provided.

BRIEF DESCRIPTION OF DRAWINGS

FIG. 3A is an example of a table used for a calculation of a grade of a voltage sensor according to the first embodiment of the present invention;

FIG. 3B is an example of the table used for the calculation of the grade of the voltage sensor according to the first embodiment of the present invention;

FIG. 3C is an example of the table used for the calculation of the grade of the voltage sensor according to the first embodiment of the present invention;

DESCRIPTION OF EMBODIMENTS

Hereinafter, embodiments of the present invention will be described with reference to the accompanying drawings.

First Embodiment

Figure 1:
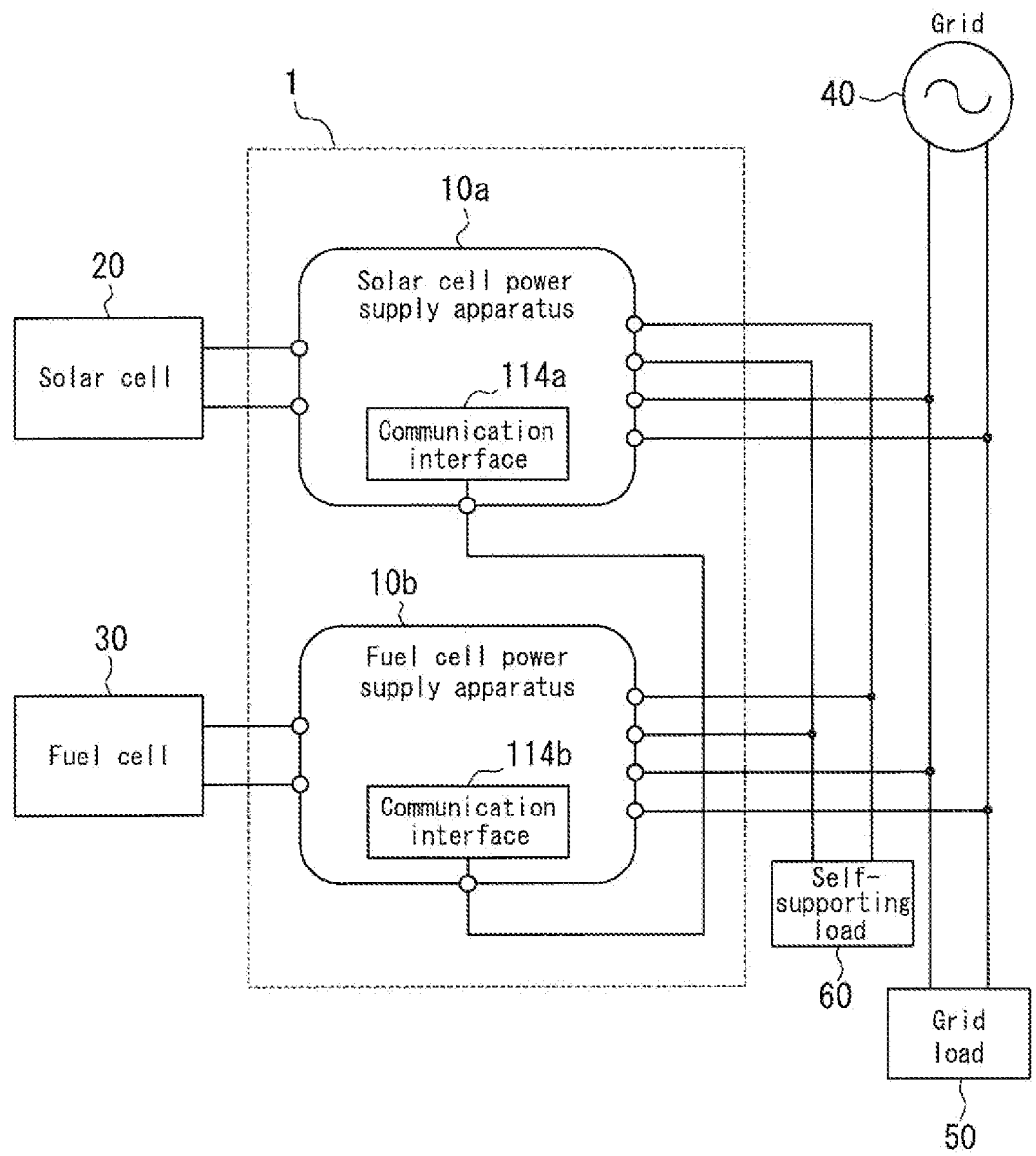
FIG. 1 is a schematic diagram of a power supply system according to a first embodiment of the present invention.

FIG. 1 is a schematic diagram of a power supply system according to a first embodiment of the present invention. A power supply system 1 includes a solar cell power supply apparatus 10a and a fuel cell power supply apparatus 10b.

The solar cell power supply apparatus 10a receives DC power from a solar cell 20, converts the DC power into AC power and outputs the AC power. The fuel cell power supply apparatus 10b receives DC power from a fuel cell 30, converts the DC power into AC power and outputs the AC power. The solar cell power supply apparatus 10a and the fuel cell power supply apparatus 10b are connected in parallel with a grid 40 to carry out a linkage operation therewith and supply the AC power to a grid load 50. The grid load 50 is, for example, a household electrical appliance such as a TV set and a refrigerator. The solar cell power supply apparatus 10a and the fuel cell power supply apparatus 10b may also be connected in parallel with a self-supporting load 60 and supply the AC power thereto. The self-supporting load 60 is, for example, the household electrical appliance such as the TV set and the refrigerator connected to the solar cell power supply apparatus 10a or the fuel cell power supply apparatus 10b in case of grid power failure.

The solar cell power supply apparatus 10a and the fuel cell power supply apparatus 10b include a communication interface 114a and a communication interface 114b, respectively, through which these conditioners may communicate with each other.

Note that, although in the present embodiment the power supply system 1 includes the solar cell power supply apparatus 10a and the fuel cell power supply apparatus 10b connected in parallel with the grid 40, this is by way of example only. For example, the power supply system according to the present invention may include a storage battery power supply apparatus, in place of the fuel cell power supply apparatus 10b and together with the solar cell power supply apparatus 10a, connected in parallel with the grid 40. Or, the storage battery power supply apparatus, together with the solar cell power supply apparatus 10a and the fuel cell power supply apparatus 10b, may be connected in parallel with the grid 40. Further, any one of these power supply apparatuses, or another power supply apparatus additionally connected in parallel with the grid 40, may be a wind turbine power supply apparatus.

Figure 2:
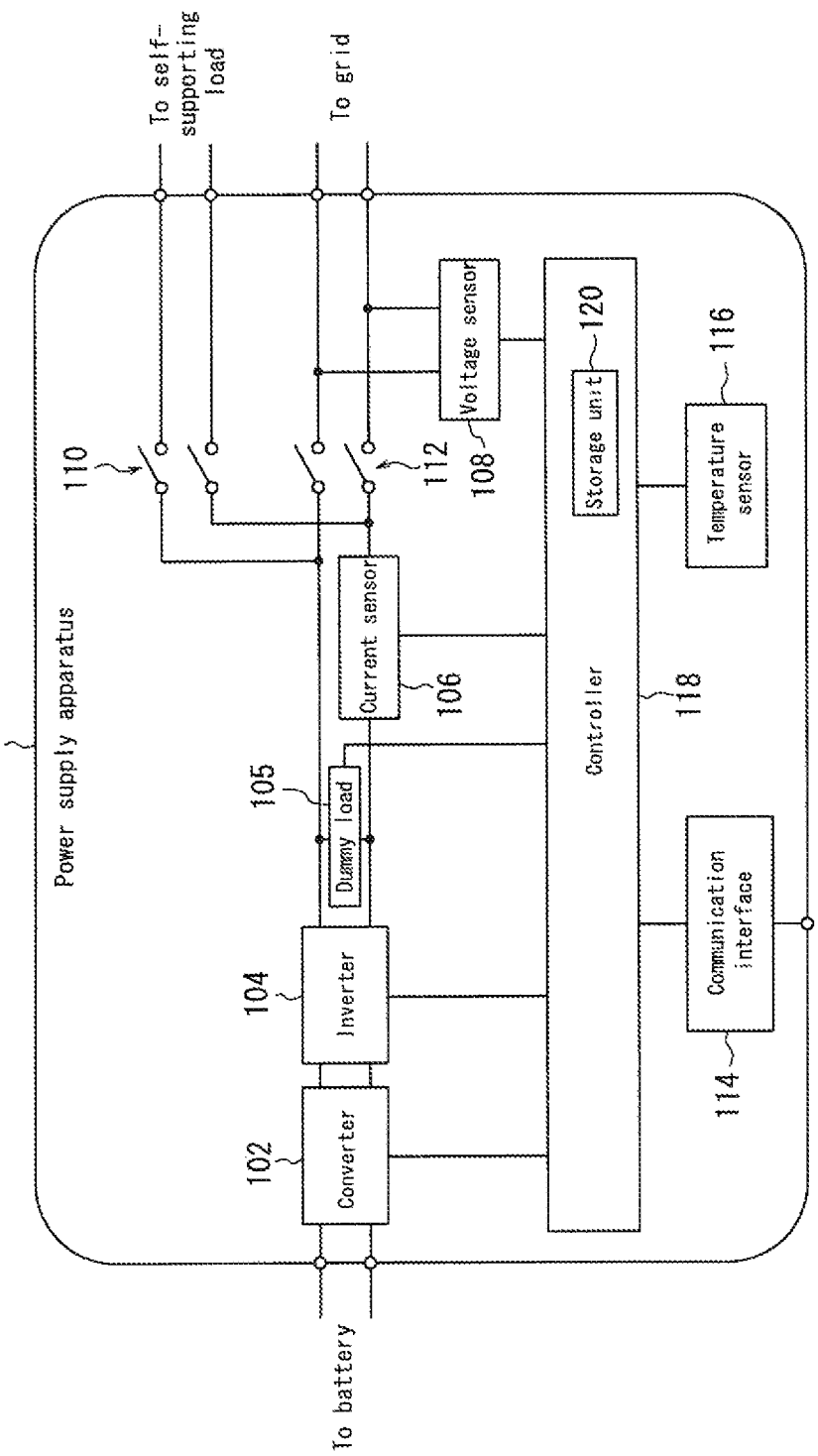
FIG. 2 is a functional block diagram illustrating a schematic configuration of a power supply apparatus according to the first embodiment of the present invention.

FIG. 2 is a functional block diagram illustrating a schematic configuration of the power supply apparatuses according to the first embodiment of the present invention. Here, since the solar cell power supply apparatus 10a and the fuel cell power supply apparatus 10b have the same configuration, these conditioners will be collectively referred to as a power supply apparatus 10.

Similarly, when a functional block of the solar cell power supply apparatus 10a and a functional block of the fuel cell power supply apparatus 10b need to be distinguished from each other, each of the functional blocks will be denoted by a reference number accompanied by a or b. When there is no need to distinguish, the functional block will be denoted by the reference number alone.

The power supply apparatus 10 includes a converter 102, an inverter 104, a dummy load 105, a current sensor 106, a voltage sensor 108, a switch 110, a switch 112, a communication interface 114, a temperature sensor 116, and a controller 118.

The converter 102 receives the DC voltage from the solar cell 20 or the fuel cell 30, steps up/down the DC voltage, and then outputs stepped-up or stepped-down DC voltage to the inverter 104.

The inverter 104 converts the DC voltage received from the converter 102 into the AC voltage and outputs the AC voltage to the grid 40 via the switch 112, or to the self-supporting load 60 via the switch 110. Here, the self-supporting load 60 is the load that is connected to the power supply apparatus 10 when, in case of grid power failure and the like, the power supply apparatus 10 is disconnected from the grid 40 to operate independently, and may be, for example, the refrigerator and the like that is connected during the grid power failure.

The dummy load 105 is connected to the inverter 104 and has an opening and closing switch controllable by the controller 118. When the opening and closing switch is open, the dummy load 105 is in an open state in which no current flows to the dummy load 105. When the opening and closing switch is closed, the dummy load 105 is connected to the inverter 104 as a predetermined load, and a current corresponding to the load flows to the dummy load 105. The dummy load 105 is set to a closed state when the current sensor 106 is adjusted. Setting the dummy load 105 to the closed state allows a current to flow from the other power supply apparatus to the power supply apparatus 10. In other normal using states, the dummy load 105 remains in the open state.

The current sensor 106 is connected to the inverter 104 to measure the AC current output by the inverter 104.

The voltage sensor 108 is connected to the grid 40 to measure the AC voltage thereof.

The voltage sensor 108 and the current sensor 106 have a grade as an index of accuracy, based on which reliability of the sensors is determined. Note that the grade may be information (grade information) stored in a storage unit 120 included in the controller 118. Also, the grade information may be exchanged, via the communication interface 114, with the other power supply apparatus. The following description uses the voltage sensor 108 as an example.

The grade of the voltage sensor 108 is calculated by a combination of the accuracy, temperature characteristics, and a cumulative operating time of voltage sensor 108. For example, the grade of the voltage sensor 108 is calculated by setting the accuracy of the voltage sensor 108 itself as a reference grade and adding, to the reference grade, a relative grade of the temperature characteristics and a relative grade of the cumulative operating time. Here, the cumulative operating time means a cumulative time from factory shipment, or from last calibration, of the power supply apparatus 10.

FIGS. 3A, 3B, and 3C illustrate examples of the reference grade of the accuracy of the voltage sensor 108 itself, the relative grade of the temperature characteristics, and the relative grade of the cumulative operation time, respectively. FIG. 3A is a table illustrating an example of a correspondence between the accuracy of the voltage sensor 108 itself and the reference grade. FIG. 3B is a table illustrating an example of a correspondence between the temperature characteristics of the voltage sensor 108 and the relative grade. FIG. 3C is a table illustrating an example of a correspondence between the cumulative operation time of the voltage sensor 108 and the relative grade.

For example, when the accuracy of the voltage sensor 108 itself is ±1.0%, the temperature characteristics is ±2.5%, and the cumulative operation time is a half year, the grade of the voltage sensor 108 is calculated by: 4−1+3=6. In the example illustrated in FIGS. 3A, 3B, and 3C, the larger the value of the grade is, the higher the reliability of the voltage sensor 108 is.

Now, referring back to FIG. 2, the description of the other functional block will be resumed.

The switch 110 is connected between the inverter 104 and the self-supporting load 60. When the switch 110 is in an open state, the power supply apparatus 10 is disconnected from the self-supporting load 60. When the switch 110 is in a closed state, the power supply apparatus 10 is connected to the self-supporting load 60.

The switch 112 is connected between the inverter 104 and the grid 40. When the switch 112 is in an open state, the power supply apparatus 10 is disconnected from the grid 40. When the switch 112 is in a closed state, the power supply apparatus 10 is connected to the grid 40.

In the present embodiment, the switch 110 is in the open state while the switch 112 is in the closed state, and the power supply apparatus 10 is disconnected from the self-supporting load 60 but connected to the grid 40.

The communication interface 114 is an interface that allows the power supply apparatus 10 to communicate with the other power supply apparatus. For example, the solar cell power supply apparatus 10a and the fuel cell power supply apparatus 10b may communicate with each other via the communication interface 114a and the communication interface 114b, respectively.

The temperature sensor 106 measures the temperature inside the power supply apparatus 10. The temperature measured by the temperature sensor 116 is used for determination of the temperature characteristics of the voltage sensor 108 and the current sensor 10. Accordingly, the temperature sensor 116 is preferably disposed in the vicinity of the voltage sensor 108 and the current sensor 106.

The controller 118 controls and manages each functional block of the entire power supply apparatus 10. The controller 118 may be constituted by using software to be executed by any appropriate processor such as CPU (Central Processing Unit), or a dedicated processor specialized for each processing (for example, DSP (Digital Signal Processor)).

The controller 118 obtains a measured voltage value (a first measured voltage value in the claims) of the grid 40 from the voltage sensor 108. The controller 118 also obtains a measured current value (a first measured current value in the claims) of the output of the inverter 104 from the current sensor 106.

The controller 118, based on the measured voltage value of the grid 40 or the current value output by the inverter 104 that are obtained, controls the converter 102 and the inverter 104. For example, when the measured voltage value is larger than a predetermined threshold, the controller 118, from the viewpoint of protection of the grid 40, suppresses power output by stopping the converter 102 and the inverter 104. Alternatively, the controller 118 may suppress the power output by setting the switch 112 to the open state.

The controller 118 calculates the grades of the voltage sensor 108 and the current sensor 106 (a first grade in the claims). Also, the controller 118 obtains the grades of the voltage sensor and the current sensor of the other power supply apparatus (a second grade in the claims) via the communication interface 114.

The controller 118 compares the grade of the voltage sensor 108 to that of the voltage sensor of the other power supply apparatus and sets the voltage sensor with a higher grade as a reference voltage sensor. Also, the controller 18 compares the grade of the current sensor 106 to that of the current sensor of the other power supply apparatus and sets the current sensor with a higher grade as a reference current sensor.

The controller 118 obtains the measured voltage value of the grid 40 measured by the voltage sensor of the other power supply apparatus (a second measured voltage value in the claims) via the communication interface 114. Also, the controller 118 obtains the measured current value of the grid 40 measured by the current sensor of the other power supply apparatus (a second measured current value in the claims) via the communication interface 114.

The controller 118 adjusts the voltage sensor 108 or the measured voltage value of the voltage sensor 108 such that the measured voltage value of the voltage sensor 108 meets the measured voltage value of the reference voltage sensor.

The controller 118, when the grade of the voltage sensor 108 is higher than that of the voltage sensor of the other power supply apparatus, sets the voltage sensor 108 as the reference voltage sensor and thus does not adjust the voltage sensor 108 or the measured voltage value of voltage sensor 108.

When the grade of the voltage sensor 108 is lower than that of the voltage sensor of the other power supply apparatus, the voltage sensor of the other power supply apparatus is set as the reference voltage sensor. Accordingly, the controller 118 adjusts the voltage sensor 108 or the measured voltage value of the voltage sensor 108. When the grade of the voltage sensor 108 is equal to that of the voltage sensor of the other power supply apparatus, both of the voltage sensors may be set as the reference voltage sensors and the voltage sensor 108 or the measured voltage value of the voltage sensor 108 may be adjusted so as to meet an average value of the measured voltage value of the voltage sensor 108 and the measured voltage value of the voltage sensor of the other power supply apparatus.

Figure 4:
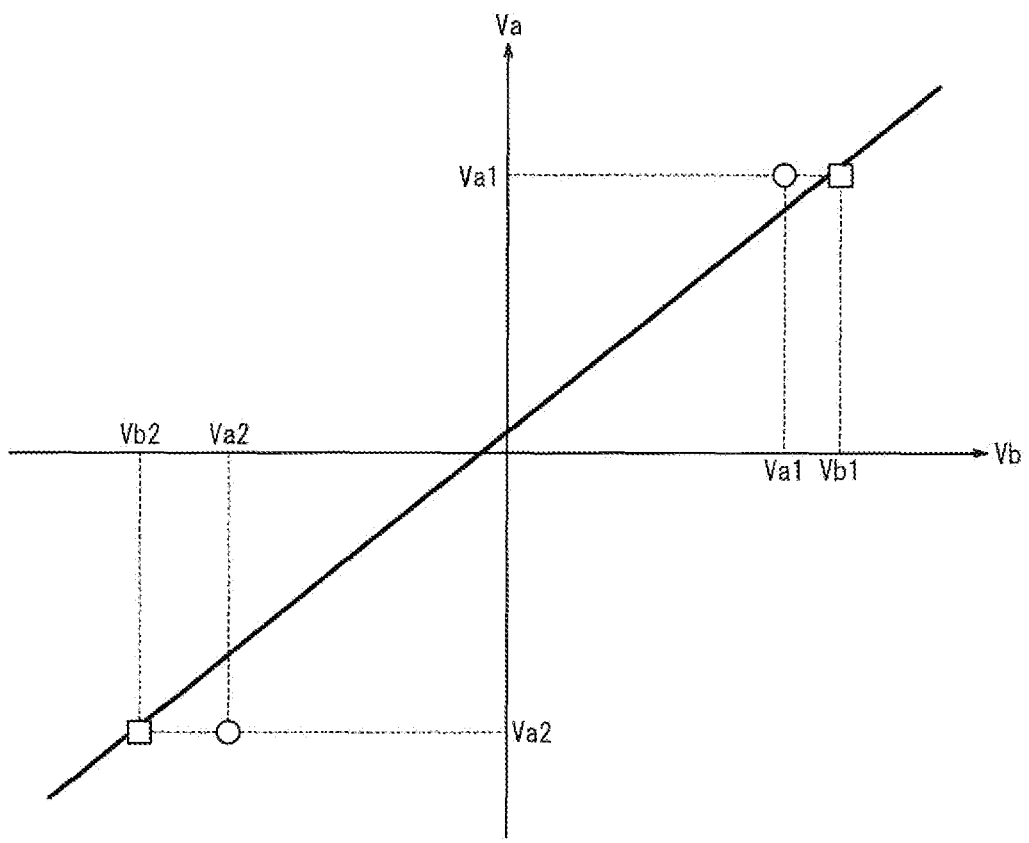
FIG. 4 illustrates an example of an adjustment of a measured voltage value of the power supply system according to the first embodiment of the present invention.

FIG. 4 illustrates an example of the adjustment of the voltage sensor 108 or the measured voltage value of the voltage sensor 108 carried out by the controller 118. In a graph of FIG. 4, a voltage Va of a vertical axis represents the measured voltage value of the reference voltage sensor, and a voltage Vb of a horizontal axis represents the measured voltage value of the voltage sensor which is not the reference voltage sensor (hereinafter, referred to as a "non-reference voltage sensor", hereinafter).

In FIG. 4, Va1 represents a maximum value of the measured voltage value measured by the reference voltage sensor, and Va2 represents a minimum value thereof. Similarly, Vb1 represents a maximum value of the measured voltage value measured by the non-reference voltage sensor, and Va2 represents a minimum value thereof. FIG. 4 illustrates an example where Vb1>Va1 and Vb2<Va2 are satisfied. In this case, a square symbol represents an adjusted measured voltage value Vb1 measured by the non-reference voltage sensor so as to meet the Va1, and another square symbol represents an adjusted measured voltage value Vb2 so as to meet the Va2. As illustrated in FIG. 4, based on a relation of a straight line connecting the two squares, the non-reference voltage sensor or the measured voltage value of the non-reference voltage sensor may be adjusted.

Note that the above method of the adjustment of the voltage sensor 108 or the measured voltage value of the voltage sensor 108 is used by way of example only, and the controller 118 may adjust the voltage sensor 108 or the measured voltage value of the voltage sensor 108 in a variety of manners. For example, the controller 118 may use the maximum value, the minimum value and an origin, or use measured voltage values of yet more points, to carry out the adjustment of the voltage sensor 108 or the measured voltage value of the voltage sensor 108.

When an adjustment amount of the voltage sensor 108 or the measured voltage value of the voltage sensor 108 is larger than a predetermined threshold, the voltage sensor 108 is highly likely to be faulty, and thus the controller 118 may determine that the voltage sensor 108 is faulty. Similarly, when an adjustment amount of the current sensor 106 or the measured current value of the current sensor 106 is larger than a predetermined threshold, the current sensor 106 is highly likely to be faulty, and thus the controller 118 may determine that the current sensor 106 is faulty.

Figure 5:
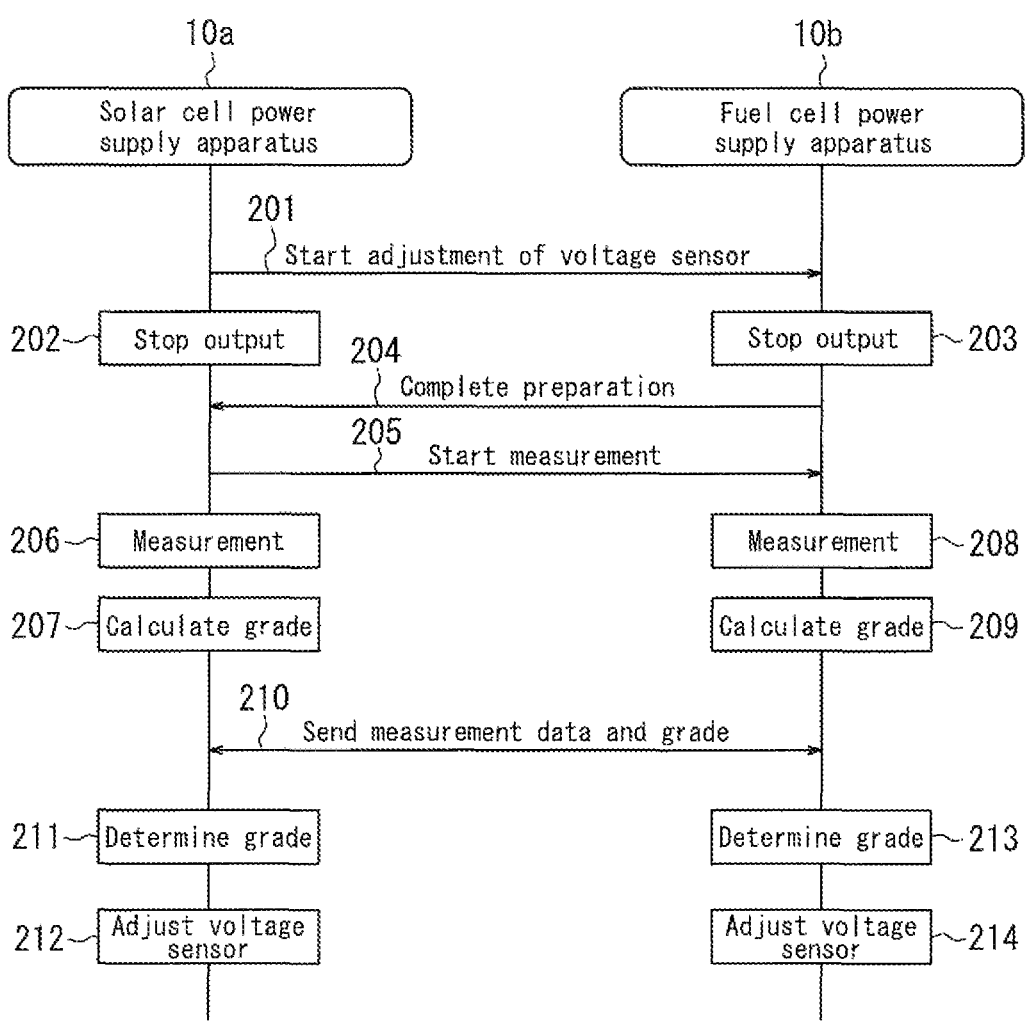
FIG. 5 is a sequence diagram illustrating an operation to adjust the voltage sensor of the power supply system according to the first embodiment of the present invention.

FIG. 5 illustrates a sequence of the adjustment of the voltage sensor 108 by the solar cell power supply apparatus 10a and the fuel cell power supply apparatus 10b. In order to distinguish between the functional block of the solar cell power supply apparatus 10a and the functional block of the fuel cell power supply apparatus 10b, the functional block of the solar cell power supply apparatus 10a will be denoted by a reference number accompanied by "a" (for example, a voltage sensor 108a) and the functional block of the fuel cell power supply apparatus 10b will be denoted by a reference number accompanied by "b" (for example, a voltage sensor 108b). Also, the sequence of FIG. 5 will be described by using an example where the grade of the voltage sensor 108b of the fuel cell power supply apparatus 10b is higher than that of the voltage sensor 108a of the solar cell power supply apparatus 10a. In this example, further, the controller 118 adjusts the voltage sensor 108 as opposed to the measured value of the voltage sensor 108.

The solar cell power supply apparatus 10a, when starting the adjustment of the voltage sensor 108a or the voltage sensor 108b, notifies the fuel cell power supply apparatus 10b that the adjustment of the voltage sensor 108b will be started (201 of FIG. 5). Subsequently, the solar cell power supply apparatus 10a stops output of a converter 102a and an inverter 104a (202 of FIG. 5).

Upon receiving the notification of the start of the adjustment of the voltage sensor 108b from the solar cell power supply apparatus 10a, the fuel cell power supply apparatus 10b stops output of a converter 102b and a inverter 104b (203 of FIG. 5). Subsequently, the fuel cell power supply apparatus 10b notifies the solar cell power supply apparatus 10a that a preparation for the adjustment of the voltage sensor 108b is completed (204 of FIG. 5).

Upon receiving the notification that the preparation for the adjustment of the voltage sensor 108b is completed, the solar cell power supply apparatus 10a notifies the fuel cell power supply apparatus 10b that the measurement of the voltage of the grid 40 will be started (205 of FIG. 5).

Then, the solar cell power supply apparatus 10a obtains the voltage value of the grid 40 measured by the voltage sensor 108a (206 of FIG. 5). Also, the solar cell power supply apparatus 10a calculates the grade of the voltage sensor 108a (207 of FIG. 5).

Upon receiving the notification that the measurement of the voltage of the grid 40 will be started from the solar cell power supply apparatus 10a, the fuel cell power supply apparatus 10b obtains the voltage value of the grid 40 measured by the voltage sensor 108b (208 of FIG. 5). Also, the fuel cell power supply apparatus 10b calculates the grade of the voltage sensor 108b (209 of FIG. 5).

The solar cell power supply apparatus 10a and the fuel cell power supply apparatus 10b, after finishing the measurement of the voltage of the grid 40 and the calculation of the grades of the voltage sensors 108a and 108b, exchange the measured voltage values of the grid 40 and the grades of the voltage sensors 108a and 108b (210 of FIG. 5).

The solar cell power supply apparatus 10a compares the grade of the voltage sensor 108b received from the fuel cell power supply apparatus 10b to the grade of the voltage sensor 108a and, since the grade of the voltage sensor 108b is higher than that of the voltage sensor 108a, sets the voltage sensor 108b of the fuel cell power supply apparatus 10b as the reference voltage sensor (211 of FIG. 5). The solar cell power supply apparatus 10a adjusts the voltage sensor 108a such that the voltage value of the grid 40 measured by the voltage sensor 108a meets the voltage value measured by the reference voltage sensor (the voltage sensor 108b) (212 of FIG. 5).

Similarly, the fuel cell power supply apparatus 10b compares the grade of the voltage sensor 108a received from the solar cell power supply apparatus 10a to the grade of the voltage sensor 108b and, since the grade of the voltage sensor 108b is higher than that of the voltage sensor 108a, sets the voltage sensor 108b of the fuel cell power supply apparatus 10b as the reference voltage sensor (213 of FIG. 5). Since the voltage sensor 108b is set as the reference voltage sensor, the fuel cell power supply apparatus 10b uses the voltage value measured by the voltage sensor 108b as it is (214 of FIG. 5).

According to the present embodiment, as described above, a plurality of power supply apparatuses connected in parallel with the grid that may obtain the same measured voltage value of the same voltage may be provided.

Also, the controller 118 compares the grade of the voltage sensor 108 to the grade of the voltage sensor of the other power supply apparatus and carries out the adjustment by setting the voltage sensor with a higher grade as the reference voltage sensor. Thereby, the voltage may be measured more accurately.

Also, since the controller 118 carries out the adjustment while stopping the converter 102 and the inverter 104, the voltage sensor 108 may be adjusted in a more stable condition.

Also, since the controller 118, when the adjustment amount of the voltage sensor 108 exceeds the predetermined threshold, determines that the voltage sensor 108 is faulty, the voltage sensor 108 in a faulty condition may be quickly detected.

Note that, although the sequence of FIG. 5 is described assuming that the solar cell power supply apparatus 10a instructs the adjustment of the voltage sensor 108a or the voltage sensor 108b, this is by way of example only. The function of the solar cell power supply apparatus 10a and the function of the fuel cell power supply apparatus 10b are interchangeable.

Also, in the schematic diagram of the power supply system of the present embodiment of FIG. 1, the fuel cell 30 and the fuel cell power supply apparatus 10b may be replaced with a storage battery and a storage battery power supply apparatus, respectively. A functional block of the storage battery power supply apparatus will be described referring to FIG. 2. In the storage battery power supply apparatus, the converter 102 and the inverter 104 carry out bidirectional operations. The inverter 104 may convert the AC voltage received from the grid 40 into the DC voltage and output the DC voltage to the converter 102. The converter 102 may step up/down the DC voltage received from the inverter 104 and output the stepped-up or the stepped-down DC voltage to be stored in the storage battery.

Further, although the present embodiment is described by using a solar cell and a fuel cell as examples, the present invention is not limited thereto but may be substantialized by using different types of batteries.

Second Embodiment

While in the first embodiment the adjustment of the voltage sensor of the power supply apparatus has been described, adjustment of the current of the power supply apparatus will be described in a second embodiment.

Figure 6:
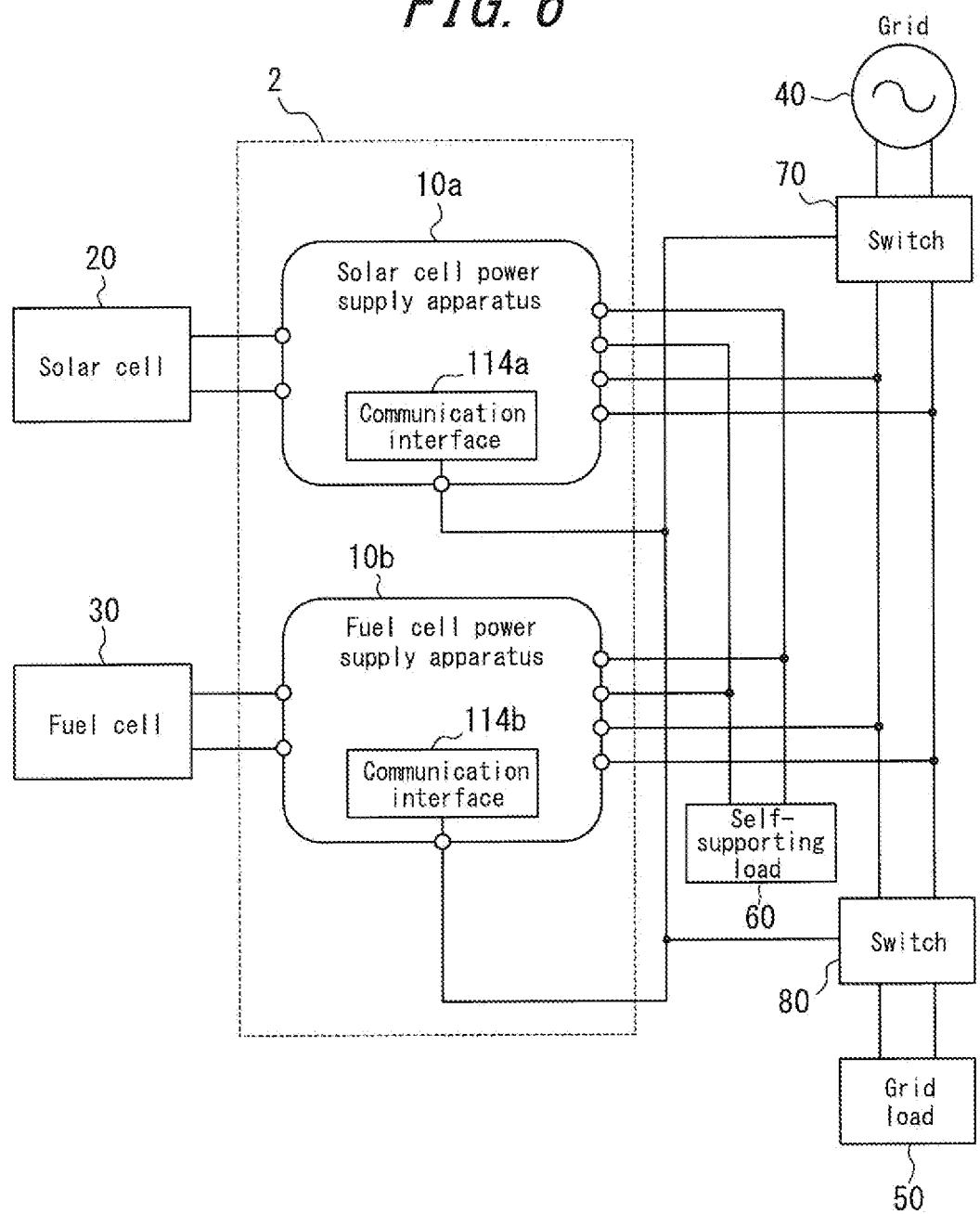
FIG. 6 is a schematic diagram of a power supply system according to a second embodiment of the present invention.

FIG. 6 is a schematic diagram of a power supply system according to the second embodiment of the present invention. A power supply system 2 includes the solar cell power supply apparatus 10a and the fuel cell power supply apparatus 10b.

The solar cell power supply apparatus 10a receives the DC power from the solar cell 20, converts the DC power into the AC power and outputs the AC power. The fuel cell power supply apparatus 10b receives the DC power from the fuel cell 30, converts the DC power into the AC power and outputs the AC power. The solar cell power supply apparatus 10a and the fuel cell power supply apparatus 10b are connected in parallel with the grid 40 to carry out the linkage operation therewith and supply the AC power to the grid load 50. The grid load 50 is, for example, the household electrical appliance such as the TV set and the refrigerator. The solar cell power supply apparatus 10a and the fuel cell power supply apparatus 10b may also be connected in parallel with the self-supporting load 60 and supply the AC power to the self-supporting load 60. The self-supporting load 60 is, for example, the household electrical appliance such as the TV set and the refrigerator connected to the solar cell power supply apparatus 10a or the fuel cell power supply apparatus 10b in case of grid power failure.

The solar cell power supply apparatus 10a and the fuel cell power supply apparatus 10b include the communication interface 114a and the communication interface 114b, respectively, through which these conditioners may communicate with each other.

The solar cell power supply apparatus 10a and the fuel cell power supply apparatus 10b are connected to the grid 40 via a switch 70. When the switch 70 is in an open state, the solar cell power supply apparatus 10a and the fuel cell power supply apparatus 10b are disconnected from the grid 40. Also, when a switch 80 is in an open state, the solar cell power supply apparatus 10a and the fuel cell power supply apparatus 10b are disconnected from the grid load 50. Each of the switches 70 and 80 is connected to the communication interfaces 114a and 114b, through which these switches are controlled by the solar cell power supply apparatus 10a and the fuel cell power supply apparatus 10b.

According to the present embodiment, the functional block of the solar cell power supply apparatus 10a and the functional block of the fuel cell power supply apparatus 10b are similar to those of the first embodiment, and thus a description thereof will be omitted.

Figure 7:
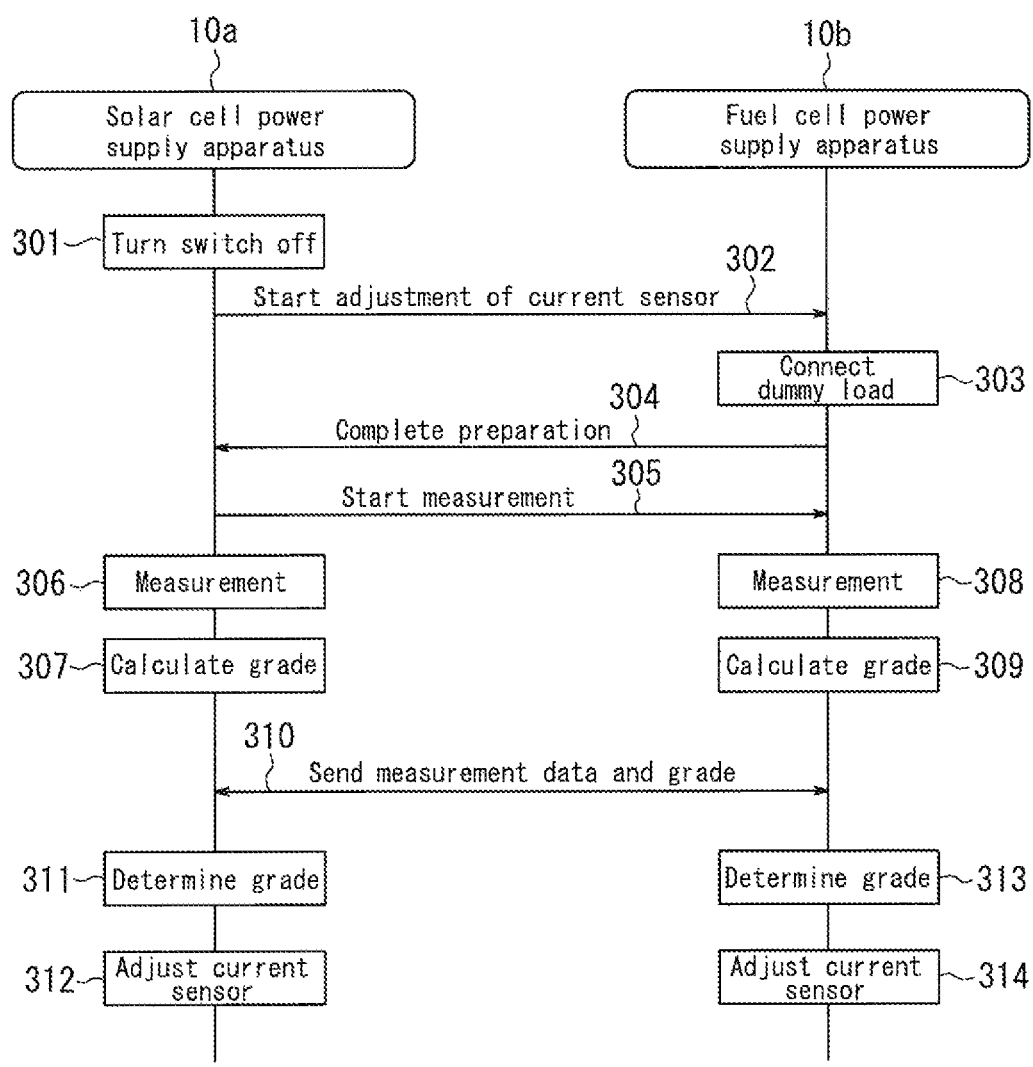
FIG. 7 is a sequence diagram illustrating an operation to adjust a current sensor of the power supply system according to the second embodiment of the present invention.

FIG. 7 illustrates a sequence of the adjustment of the current sensor 106 by the solar cell power supply apparatus 10a and the fuel cell power supply apparatus 10b. In order to distinguish between the functional block of the solar cell power supply apparatus 10a and the functional block of the fuel cell power supply apparatus 10b, the functional block of the solar cell power supply apparatus 10a will be denoted by a reference number accompanied by "a" (for example, the current sensor 106a), and the functional block of the fuel cell power supply apparatus 10b will be denoted by a reference number accompanied by "b" (for example, the current sensor 106b).

The solar cell power supply apparatus 10a, before starting the adjustment of the current sensor 106a or the current sensor 106b, turns off the switches 70 and 80 (301 of FIG. 7). Thereby, the current from the solar cell power supply apparatus 10a flows to the fuel cell power supply apparatus 10b alone. Accordingly, the current flowing to the current sensor 106a of the solar cell power supply apparatus 10a and the current flowing to the current sensor 106b of the fuel cell power supply apparatus 10b become equal to each other.

Subsequently, the solar cell power supply apparatus 10a notifies the fuel cell power supply apparatus 10b that the adjustment of the current sensor 106b will be started (302 of FIG. 7).

Upon receiving the notification that the adjustment of the current sensor 106 will be started from the solar cell power supply apparatus 10a, the fuel cell power supply apparatus 10b sets an opening/closing switch of a dummy load 105b to a closed state and connects the inverter 104b at a predetermined load. Thereby, the fuel cell power supply apparatus 10b may receive the current (303 of FIG. 7). Subsequently, the fuel cell power supply apparatus 10b notifies the solar cell power supply apparatus 10a that a preparation of the adjustment of the current sensor 106b is completed (304 of FIG. 7).

Operations thereafter (operations of 305 to 314 of FIG. 7) are similar to the sequence of the adjustment of the voltage sensor 108 described with reference to FIG. 5 (the operations of 205 to 214 of FIG. 5), other than the current sensor 106 replaces the voltage sensor 108, and thus a description thereof will be omitted.

According to the present embodiment, as described above, a plurality of power supply apparatuses connected in parallel with the grid that may obtain the same measured current values of the same current may be provided.

Also, the controller 118 compares the grade of the current sensor 106 to the grade of the current sensor of the other power supply apparatus and carries out the adjustment by setting the current sensor with a higher grade as the reference current sensor. Thereby, the current may be measured more accurately.

Also, since the controller 118 carries out the adjustment after disconnecting the solar cell power supply apparatus 10a and the fuel cell power supply apparatus 10b from the grid, the current sensor 106 may be adjusted more accurately.

Also, since the controller 118, when the adjustment amount of the current sensor 106 exceeds the predetermined threshold, determines that the current sensor 106 is faulty, the current sensor 106 in a faulty condition may be quickly detected.

Note that, in the schematic diagram of the power supply system of FIG. 1 according to the present embodiment, the fuel cell 30 and the fuel cell power supply apparatus 10b may be replaced with the storage battery and the storage battery power supply apparatus, respectively. In this case, the converter 102 and the inverter 104 carry out the bidirectional operations and allow for flow of the current. Accordingly, in using the storage battery power supply apparatus in place of the fuel cell power supply apparatus 10b, the dummy load 105 is kept in the open state, and the current from the solar cell power supply apparatus 10a may flow to the storage cell power supply apparatus.

Further, although the present embodiment is described by using the solar cell and the fuel cell as examples, the present invention is not limited thereto but may be substantialized by using different types of power sources.

Although the present invention is described based on figures and the embodiments, it is to be understood that those who are skilled in the art may easily vary or modify in a multiple manner based on disclosure of the present invention. Accordingly, such variations and modifications are included in a scope of the present invention. For example, a function included in each unit, each means or each step may be rearranged avoiding a logical inconsistency, such that a plurality of units or steps are combined or divided.

Also, the power supply apparatuses are not limited to those used for a domestic purpose but may be those used for an industrial purpose.

REFERENCE SIGNS LIST 1, 2 power supply system
10 power supply apparatus
10a solar cell power supply apparatus
10b fuel cell power supply apparatus
20 solar cell
30 fuel cell
40 grid (commercial power supply grid)
50 grid load
60 self-supporting load
70, 80 switch
102 converter
104 inverter
105 dummy load
106 current sensor
108 voltage sensor
110, 112 switch
114 communication interface
116 temperature sensor
118 controller
120 storage unit

The invention claimed is:

1. A power supply apparatus connected in parallel with a grid comprising:
a voltage sensor configured to obtain a first measured voltage value by measuring a voltage of the grid;
a communication interface configured to communicate with another power supply apparatus connected in parallel with the grid; and
a controller configured to obtain, via the communication interface, a second measured voltage value obtained by the another power supply apparatus by measuring the voltage of the grid and carrying out an adjustment such that the first measured voltage value and the second measured voltage value approximate to the same voltage value of the grid.

2. The power supply apparatus according to claim 1, wherein the controller
includes a first grade as an index of accuracy of the voltage sensor;
obtains a second grade of a voltage sensor of the another power supply apparatus via the communication interface; and
compares the first grade to the second grade and carries out an adjustment on the basis of the voltage sensor with a higher grade.

3. The power supply apparatus according to claim 1, wherein the controller carries out the adjustment while stopping an output of the power supply apparatus.

4. The power supply apparatus according to claim 1, wherein the controller, when an adjustment amount exceeds a predetermined threshold, determines that the voltage sensor is faulty.

5. A power supply apparatus connected in parallel with a grid comprising:
a current sensor configured to obtain a first measured current value by measuring a current output by the power supply apparatus;
a communication interface configured to communicate with another power supply apparatus connected in parallel with the grid; and
a controller configured to obtain, via the communication interface, a second measured current value measured and obtained by the another power supply apparatus and carrying out an adjustment such that the first measured current value and the second measured current value approximate to the same value.

6. The power supply apparatus according to claim 5, wherein the controller
includes a first grade as an index of accuracy of the current sensor;
obtains a second grade of a current sensor of the another power supply apparatus via the communication interface; and
compares the first grade and the second grade and carries out an adjustment on the basis of the current sensor with a higher grade.

7. The power supply apparatus according to claim 5, wherein the controller disconnects the power supply apparatus and the another power supply apparatus from the grid to carry out the adjustment.

8. The power supply apparatus according to claim 5, wherein the controller, when an adjustment amount exceeds a predetermined threshold, determines that the current sensor is faulty.

9. A control method of a power supply apparatus connected in parallel with a grid, comprising:
a step of obtaining a first measured voltage value by measuring a voltage of the grid;
a step of obtaining a second measured voltage value obtained by another power supply apparatus connected to the grid by measuring the voltage of the grid; and
a step of carrying out an adjustment such that the first measured voltage value and the second measured voltage value approximate to the same voltage value of the grid.

10. A control method of a power supply apparatus connected in parallel with a grid, comprising:
a step of obtaining a first measured current value by measuring a current output by the power supply apparatus;
a step of obtaining a second measured current value measured and obtained by another power supply apparatus connected to the grid; and
a step of carrying out an adjustment such that the first measured current value and the second measured current value approximate to the same value.

11. A power supply system comprising the plurality of power supply apparatuses according to claim 1 connected in parallel with the grid.

12. A power supply system comprising the plurality of power supply apparatuses according to claim 5 connected in parallel with the grid.

* * * * *